US010875231B2

(12) United States Patent
Morikami

(10) Patent No.: US 10,875,231 B2
(45) Date of Patent: Dec. 29, 2020

(54) MANUFACTURING METHOD OF LIQUID CONTAINING CONTAINER

(71) Applicant: YOSHINO KOGYOSHO CO., LTD., Tokyo (JP)

(72) Inventor: Shigeki Morikami, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 95 days.

(21) Appl. No.: 16/317,897

(22) PCT Filed: Jun. 12, 2017

(86) PCT No.: PCT/JP2017/021679
§ 371 (c)(1),
(2) Date: Jan. 15, 2019

(87) PCT Pub. No.: WO2018/020865
PCT Pub. Date: Feb. 1, 2018

(65) Prior Publication Data
US 2020/0230863 A1    Jul. 23, 2020

(30) Foreign Application Priority Data
Jul. 29, 2016 (JP) .................................. 2016-150464

(51) Int. Cl.
*B29C 49/46* (2006.01)
*B29C 49/78* (2006.01)
(Continued)

(52) U.S. Cl.
CPC .............. *B29C 49/46* (2013.01); *B29C 49/78* (2013.01); *B65B 3/02* (2013.01); *B67B 1/06* (2013.01); *B29C 2049/4605* (2013.01)

(58) Field of Classification Search
CPC ... B29C 49/46; B29C 2049/4664; B65B 3/02; B67B 1/06
See application file for complete search history.

(56) References Cited

U.S. PATENT DOCUMENTS 5,522,439 A * 6/1996 Hakansson ............... B65B 3/30
141/177
10,363,698 B2 * 7/2019 Diesnis ............... B29C 49/4236
(Continued)

FOREIGN PATENT DOCUMENTS

CN    105050795 A    11/2015
EP    2 767 385 A1    8/2014
(Continued)

OTHER PUBLICATIONS

Jan. 29, 2019 International Preliminary Report on Patentability issued in International Patent Application No. PCT/JP2017/021679.
(Continued)

*Primary Examiner* — Robert B Davis
(74) *Attorney, Agent, or Firm* — Oliff PLC

(57) ABSTRACT

In a manufacturing method of a liquid containing container, a capper has a container holding portion configured to be displaced at a constant first velocity in the circumferential direction of a first central axis, the method including: a liquid blow molding step of molding a preform disposed in a cavity of a mold into a container body having a barrel containing a liquid; an intermediate conveying step of, after the mold is opened, gradually accelerating the container body to a third velocity and delivering the container body to a carrier of a rotary conveying machine by an intermediate conveying device; a rotary conveying step of conveying the container body and delivering the container body to the container holding portion by the carrier of the rotary conveying machine; and a capping step of attaching a cap while the container body is conveyed by the container holding portion.

14 Claims, 7 Drawing Sheets

(51) Int. Cl.
*B65B 3/02* (2006.01)
*B67B 1/06* (2006.01)

(56) References Cited

U.S. PATENT DOCUMENTS

| | | | |
|---|---|---|---|
| 2006/0086410 | A1 | 4/2006 | Bernhard |
| 2015/0375441 | A1* | 12/2015 | Desoutter ........... B29C 49/4205 264/523 |
| 2019/0308264 | A1* | 10/2019 | Clark ........................ B22F 5/04 |

FOREIGN PATENT DOCUMENTS

| | | | |
|---|---|---|---|
| JP | S62-122987 A | 6/1987 | |
| JP | H01-199896 A | 8/1989 | |
| JP | 2007-284094 A | 11/2007 | |
| JP | 4224274 B2 | 2/2009 | |
| JP | 2013-139296 A | 7/2013 | |
| JP | 2016-032921 A | 3/2016 | |
| JP | 2016-037375 A | 3/2016 | |
| JP | 2016-506887 A | 3/2016 | |
| WO | 2015/059101 A1 | 4/2015 | |
| WO | 2015/197846 A1 | 12/2015 | |
| WO | 2016/017153 A1 | 2/2016 | |
| WO | 2016/096145 A1 | 6/2016 | |

OTHER PUBLICATIONS

Aug. 29, 2017 International Search Report issued in International Patent Application No. PCT/JP2017/021679.
Apr. 8, 2020 Extend Search Report issued in European Patent Application No. 17833875.2.
Apr. 21, 2020 Office Action issued in Japanese Patent Application No. 2016-150464.
May 7, 2020 Office Action issued in Chinese Patent Application No. 201780044660.1.

* cited by examiner

MANUFACTURING METHOD OF LIQUID CONTAINING CONTAINER

TECHNICAL FIELD

The present disclosure relates to a manufacturing method of a liquid containing container.

BACKGROUND

A container including a container body made of resin, representatives of which are polypropylene (PP) and polyethylene terephthalate (PET), and a cap attached to a mouth of the container body is used for applications in which a variety of liquids such as beverages, toiletries such as cosmetics, chemicals, detergents, shampoos or the like are contained as a content liquid.

In general, a container body of such a container is manufactured by blow molding a preform formed by a thermoplastic resin material. Further, a cap is usually attached to a container body by filling the container body with a liquid and continuously feeding the container body to a rotary capper as described in Patent Literature 1 (PTL 1), for example.

In blow molding, a pressurized medium is supplied into a preform and the preform is formed into a container body having a portion of a shape conforming to an inner surface of a cavity of a mold for blow molding, and a liquid blow molding in which a liquid is used as a pressurized medium is known.

For example, according to a liquid blow molding described in Patent Literature 2 (PTL 2), for example, a content liquid to be contained in a container is used as a pressurized medium to be supplied into a preform when liquid blow molding is performed. Thus a filling process of a content liquid into a molded container body is omitted, and as a result, the manufacturing process and molding and filling lines can be simplified.

CITATION LIST

Patent Literature

PTL 1: JP2013-139296A
PTL 2: JP2016-032921A

SUMMARY

Technical Problem

When a container containing a liquid is manufactured by using a mold for liquid blow molding and a rotary capper, after a molded container is ejected from the mold, it is required to convey the molded container to a capping position as fast as possible without spilling the liquid in the container body from the mouth. In particular, as a container body becomes thinner (lighter), a liquid tends to spill out easier. Thus the manufacturing speed tends to be reduced.

The present disclosure is to solve the above problem, and the present disclosure is to provide a manufacturing method of a liquid containing container by which a manufacturing speed of a container can be improved when a container containing liquid is manufactured by using a mold for liquid blow molding and a rotary capper.

Solution to Problem

The disclosed manufacturing method of a liquid containing container is provided for manufacturing a container containing a liquid by using a mold for liquid blow molding, an intermediate conveying device, a rotary conveying machine and a rotary capper, the capper having a container holding portion configured to be displaced at a constant first velocity in the circumferential direction of a first central axis, and the rotary conveying machine having a carrier configured to be displaced at a second velocity in the circumferential direction of a second central axis, the method including:

a liquid blow molding step of supplying a pressurized liquid into a preform disposed in a cavity of the mold to mold the preform into a container body having a barrel portion that contains the liquid;

an intermediate conveying step of, after the mold is opened, gradually accelerating the container body to a third velocity and delivering the container body to the carrier of the rotary conveying machine by the intermediate conveying device;

a rotary conveying step of conveying the container body and delivering the container body to the container holding portion of the capper by the carrier of the rotary conveying machine; and a capping step of attaching a cap to a mouth continuous with the barrel of the container body while the container body is conveyed by the container holding portion of the capper.

Further, in the disclosed manufacturing method of a liquid containing container, preferably, the capper has a plurality of the container holding portions disposed at a first pitch in the circumferential direction of the first central axis;

the rotary conveying machine has a plurality of the carriers disposed at a second pitch in the circumferential direction of the second central axis;

the mold has a plurality of the cavities;

in the liquid blow molding step, a plurality of the preforms are formed into a plurality of the container bodies each having the barrel containing the liquid by the mold;

in the intermediate conveying step, after the mold is opened, the container bodies are gradually accelerated to the third velocity and sequentially delivered to the carriers of the rotary conveying machine by the intermediate conveying device;

in the rotary conveying step, the container bodies are carried and sequentially delivered to the container holding portions of the capper by the carriers; and in the capping step, the cap is attached to the mouth of the container bodies while the container bodies are carried by the container holding portions.

Moreover, in the disclosed manufacturing method of a liquid containing container, preferably, the second velocity and the second pitch are to be constant relative to the circumferential direction of the second central axis;

a third pitch of the container bodies at the time when they are delivered from the intermediate conveying device to the rotary conveying machine, the second pitch and the first pitch are matched to each other; and the second velocity is matched to the first velocity and to the third velocity.

Furthermore, in the disclosed manufacturing method of a liquid containing container, preferably, the rotary conveying machine includes:

a rotary table configured to hold the carriers and rotate at a constant angular velocity in the circumferential direction of the second central axis; and a carrier drive device configured to displace forward/backward the carriers, relative to the rotary table, in the circumferential direction of the second central axis.

Moreover, in the disclosed manufacturing method of a liquid containing container, preferably, when the third pitch of the container bodies at the time when they are delivered from the intermediate conveying device to the rotary conveying machine is different from the first pitch, the second pitch is differentiated between the intermediate conveying device side and the capper side so as to enable the carriers of the rotary conveying machine to receive the container bodies from the intermediate conveying device and to deliver the container bodies to the container holding portions of the capper.

Furthermore, in the disclosed manufacturing method of a liquid containing container, preferably, when the third velocity is different from the first velocity, the second velocity is differentiated between the intermediate conveying device side and the capper side so as to enable the carriers of the rotary conveying machine to receive the container bodies from the intermediate conveying device and to deliver the container bodies to the container holding portions of the capper.

Moreover, in the disclosed manufacturing method of a liquid containing container, preferably, the intermediate conveying device, the rotary conveying machine and the capper convey the container body with the container body disposed in a cup.

Advantageous Effect

According to the present disclosure, when a container containing liquid is manufactured by using a mold for liquid blow molding and a rotary capper, a manufacturing method of a liquid containing container that can improve a manufacturing speed of a container can be provided.

DETAILED DESCRIPTION

A manufacturing method of a liquid containing container according to an embodiment of the present disclosure will be illustrated in detail below with reference to the drawings.

Figure 1:
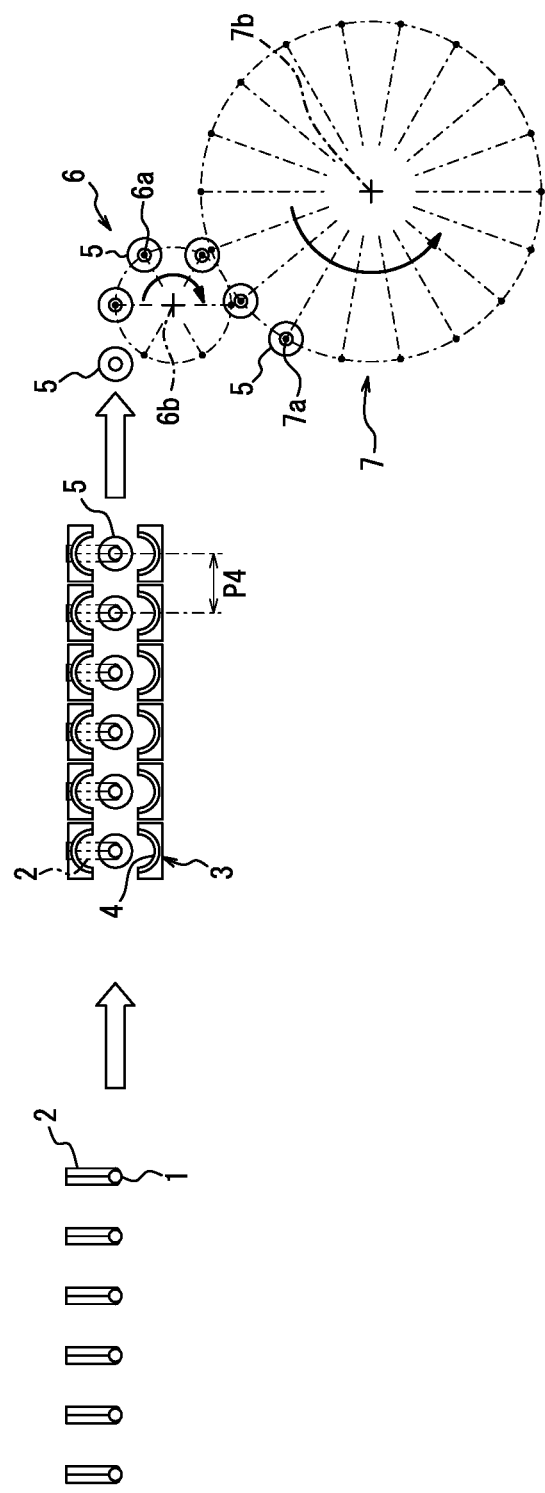
FIG. 1 is a schematic plan view illustrating each step of a manufacturing method of a liquid containing container according to an embodiment of the present disclosure.
Figure 3:
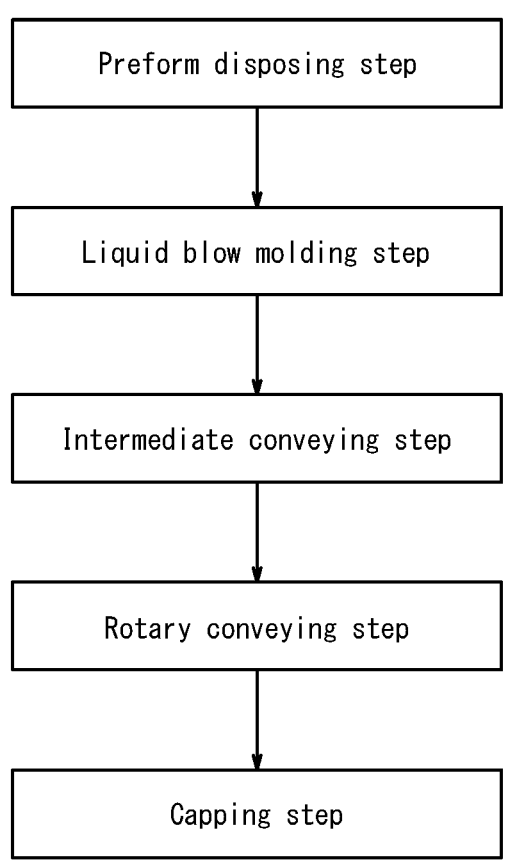
FIG. 3 is diagram illustrating a procedure of the manufacturing method of a liquid containing container according to an embodiment of the present disclosure.

As illustrated in FIG. 1, the manufacturing method of a liquid containing container according to this embodiment is provided for manufacturing a container that contains a liquid (a liquid containing container) by using a mold 3 for liquid blow molding, an intermediate conveying device (not illustrated), a rotary conveying machine 6 and a rotary capper 7, and as illustrated in FIG. 3, the method includes a preform disposing step, a liquid blow molding step, an intermediate conveying step, a rotary conveying step and a capping step.

In greater detail, the manufacturing method of a liquid containing container according to this embodiment is a combination of a batch-type step and a continuous step. In the batch-type step, a preform 1 is conveyed and disposed in the mold 3, the preform 1 is molded into a container body 5 containing a liquid by the mold 3 at a predetermined static molding position, and after the mold is opened, the container body 5 is conveyed from the molding position and is delivered to a carrier 6a of the rotary conveying machine 6, and in the continuous step, capping is performed while the container body 5 is continuously conveyed by the rotary conveying machine 6 and the rotary capper 7 without the container body 5 being stood still.

In the illustrated example, the mold 3 has a plurality of cavities 4 (in this example, six cavities). A plurality of preforms 1 (in this example, six preforms) corresponding to the number of cavities are simultaneously conveyed and molded into a plurality of container bodies 5 (in this example, six container bodies) at the molding position, and the container bodies 5 are simultaneously conveyed and sequentially delivered to the rotary conveying machine 6. The number of cavities 4 provided in the mold 3 is not limited to six, and can be appropriately increased or decreased. Further, the number is not limited to two or more, and may be one.

Further, the cavities 4 are provided linearly in parallel at a constant fourth pitch P4 in the longitudinal direction of the mold 3. In other words, the fourth pitch P4, which is a linear distance between the centers of adjacent two cavities, is the same for all adjacent cavities.

The fourth pitch P4 may be or may not be matched to the first pitch P1 of the capper 7 described later (see FIG. 2). When the fourth pitch P4 is different from the first pitch P1, after a plurality of container bodies 5 are simultaneously or sequentially ejected from a plurality of cavities 4 of the mold 3 by the intermediate conveying device, each distance between the container bodies 5 disposed in parallel to each other is adjusted. Thus the third pitch P3, which is a distance between container bodies 5 at the time when they are delivered to the rotary conveying machine 6, can be matched to the first pitch P1.

Figure 2:
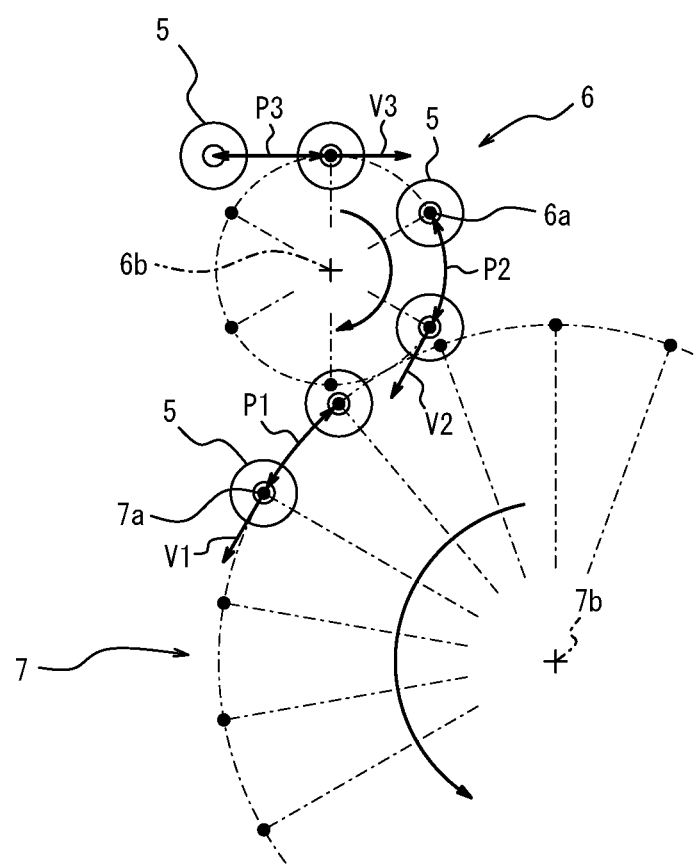
FIG. 2 is a partial enlarged view of FIG. 1.

As illustrated in FIGS. 1 and 2, the rotary capper 7 has a plurality of container holding portions 7a (in this example, 18 pieces) provided at a constant first pitch P1 in the circumferential direction of the first central axis 7b. In other words, the first pitch P1, which is a distance, on a rotational track, between the centers of adjacent two container holding portions 7a, is the same for all container holding portions 7a adjacent to each other. The number of the container holding portions 7a provided at the capper 7 is not limited to 18. It may be appropriately increased or decreased. Further, the number thereof is not limited to two or more, and may be one. Further, the container holding portions 7a are to be displaced at a constant first velocity V1 in the circumferential direction of the first central axis 7b.

Further, the rotary conveying machine 6 has a plurality of carriers 6a (in this example, six carriers) provided at a second pitch P2 in the circumferential direction of a second central axis 6b. The number of the carriers 6a provided at the rotary conveying machine 6 is not limited to six. It may be appropriately increased or decreased. Further, the number thereof is not limited to two or more, and may be one. The carriers 6a are to be displaced at a second velocity V2 in the circumferential direction of the second central axis 6b.

In this embodiment, the aforementioned second pitch P2 of the rotary conveying machine 6 is constant in the circumferential direction of the second central axis 6b (in other words, the second pitch P2, which is a distance on a rotational track between the centers of adjacent two carriers 6a, is the same for all carriers 6a adjacent to each other), and the second pitch P2 is matched to the first pitch P1.

Moreover, the aforementioned second velocity V2 of the rotary conveying machine 6 is to be constant in the circumferential direction of the second central axis 6b, and the second velocity V2 is matched to the first velocity V1. Further, after the mold is opened, a plurality of liquid containing container bodies 5 are gradually accelerated to the third velocity V3, which is matched to the first velocity V1 and to the second velocity V2, and are sequentially delivered to a plurality of carriers 6a of the rotary conveying machine 6 by the intermediate conveying device so as to allow the liquid containing container bodies 5 molded in the aforementioned batch-type step to be conveyed without a liquid being spilled from each mouth and to be delivered to the rotary conveying machine 6. Thus the step transfers to the continuous step. Moreover, in this embodiment, the third pitch P3 of the container bodies 5 is matched to the second pitch P2 and to the first pitch P1. Each process of this embodiment will be illustrated in greater detail below.

First, in the preform disposing step, the resin preform 1 is disposed in the mold 3 for liquid blow molding having the cavity 4. The preform 1 can be obtained by injection molding, direct blow molding, extrusion molding or the like, using, for example, thermoplastic resins such as polypropylene (PP) and polyethylene terephthalate (PET) as a raw material. Further, the preform 1 includes a bottomed cylindrical barrel and a mouth continuous with the barrel. The preform may be previously heated, by a heater or the like, to a predetermined temperature at which stretching effect can be expressed, and after that, the barrel of the preform 1 may be disposed in the cavity 4 of the mold 3.

It is to be noted that, the heat applied during an injection molding, for example, still remains in the preform 1 immediately after it is manufactured. Thus, by taking advantage of the heat, if the preform 1 is supplied to the mold 3 for blow molding immediately after it is manufactured, the heating process with a heating furnace can be omitted. The preform 1 can be conveyed into the cavity 4 by using a preform conveying device 2, and the preform 1 is conveyed from a heating furnace or an injection molding device of the preform 1, for example, into the cavity 4.

The preform conveying device 2 may be configured to include a gripping portion that grips a mouth (a neck ring, etc.) of the preform 1, for example. In the illustrated example, the preform conveying device 2 has six gripping portions corresponding to the number of preform 1, and the mouths of six preforms 1 linearly disposed in parallel are held by the gripping portions, respectively, and conveyed to the corresponding cavities 4.

It is to be noted that, in the preform disposing step, it is possible that the mold 3 is displaced from the molding position at which the liquid blow molding is performed by the nozzle unit to the position close to the heating furnace or the injection molding device of the preform 1, and the preform 1 is disposed in the cavity 4, then after that the mold 3 is returned to the molding position to perform the liquid blow molding step.

Further, between the liquid blow molding step and the intermediate conveying step, the mold 3 may be displaced from the molding position at which the liquid blow molding is performed to another position, and the mold 3 may be opened at the position. Furthermore, two or more pairs of molds 3 are provided displaceable relative to a pair of nozzle units, and the molds 3 are sequentially displaced to undergo liquid blow molding alternately, thus a manufacturing efficiency can be improved.

The mold 3 may be configured to be opened in right and left (in a horizontal direction) as illustrated, for example. Then, the preform 1 is inserted in each cavity 4 with the mold 3 opened, and by closing the mold 3, the preform 1 can be disposed in each cavity 4. The upper surface of the mold 3 is opened upward, and the mouth of the preform 1 is disposed in the opening.

In the liquid blow molding step following the preform disposing step, a pressurized liquid is supplied to the preform 1 disposed in each cavity 4 of the mold 3 by a liquid blow molding device consisting of the nozzle unit and the mold 3 and the preform 1 is molded into a shape conforming to the inner surface of the cavity 4 and also into a container body 5 having a liquid containing barrel.

For example, the container body 5 may have a cylindrical mouth and a bottomed cylindrical barrel that is continuous with the mouth and has a diameter larger than that of the mouth. The shapes of the mouth and the barrel can be appropriately changed. For example, the barrel may be formed into a polygonal shape or an elliptical shape instead of a circular shape viewing from top. Further, a slide mold is provided at a predetermined position of the mold 3 so as to form a knob at the barrel. Moreover, a male thread may be formed on the mouth for screwing a cap, or instead of screwing, an engagement portion that allows for undercut fitting may be provided.

The nozzle unit disposed at the molding position can supply a liquid pressurized to a pressure suitable for liquid blow molding to the preform 1 disposed in each cavity 4 of the mold 3.

The nozzle unit is vertically displaceable and can be brought in abutment with the upper surface of the mold 3. Further, the nozzle unit includes a plurality of nozzles (in this example, six nozzles) connected to the mouth of the preform 1 disposed in each cavity 4 of the mold 3 when it is brought in abutment with the upper surface of the mold 3 and a plurality of pressurized liquid supply machines (in this example, six machines corresponding to the number of nozzles) connected to each nozzle. Thus a pressurized liquid supplied from each pressurized liquid supply machine can be supplied into each preform 1 through each nozzle. Each pressurized liquid supply machine may include a plunger pump driven by a servo motor, for example. Further, a pressurized liquid may be supplied from one pressurized liquid supply machine to a plurality of nozzles. The nozzle unit may also be provided with a plurality of stretching rods, each axially stretching each preform 1 during liquid blow molding.

As a liquid for liquid blow molding supplied from the pressurized liquid supply machine into the preform 1, a content liquid such as beverages, toiletries such as cosmetics, chemicals, detergents, shampoos or the like to be contained in a container can be used. Thus, a step of filling a content liquid into the container body 5 after molding is omitted, and a manufacturing process of a container or structure of a manufacturing device can be simplified.

In the intermediate conveying step following the liquid blow molding step, after the mold 3 is opened, a plurality of container bodies 5 are gradually accelerated in a linear manner (in other words, as a linear track is drawn) to the third velocity V3, which matches to the first velocity V1 and the second velocity V2, and are sequentially delivered to a plurality of carriers 6a of the rotary conveying machine 6 by the intermediate conveying device. Instead of a linear manner, the container bodies 5 may be gradually accelerated in a curved manner (in other words, as a curve track is drawn).

Here, "container bodies 5 are gradually accelerated to the third velocity V3 and are sequentially delivered to carriers 6a of the rotary conveying machine 6" includes the case where the container bodies 5 are gradually accelerated, and at the time of reaching the third velocity V3, they are delivered to the carriers 6a of the rotary conveying machine 6, and the case where the container bodies 5 are gradually accelerated and after reaching the third velocity V3, they are delivered to the carriers 6a of the rotary conveying machine 6 while the third velocity V3 is kept.

In this manner, occurrence of deceleration of the container body 5 can be suppressed when a step transfers from the batch-type step to the continuous step, and the inertia force acting on the liquid in the container body 5 is suppressed. As a result, a possibility of spilling of a liquid can be reduced, and therefore a conveying velocity of the container body 5 can be increased.

Here, a variety of types of intermediate conveying devices can be adopted. For example, a conveying machine having holding portions (in this example, six holding portions corresponding to six container bodies 5) configured to collectively grip or hook a mouth (a neck ring, etc.) of each container body 5 may be provided as the intermediate conveying device. In other words, with such a conveying machine, a plurality of container bodies 5 can be collectively and gradually accelerated in a linear manner from a static state (preferably, a statically opened position) to the third velocity V3, and be sequentially delivered to the carriers 6a of the rotary conveying machine 6. Instead of a linear manner, the container bodies 5 may be gradually accelerated in a curved manner. This conveying machine may be used also as the preform conveying device 2.

Further, a plurality of container bodies 5 may be collectively conveyed to a conveying chain device by using such a conveying machine, and be sequentially delivered from the conveying chain device to the carriers 6a of the rotary conveying machine 6. In other words, when such a conveying machine and a conveying chain device are used as the intermediate conveying device, the container bodies 5 can be collectively and gradually accelerated in a linear manner from the static state (preferably, a statically opened position) to the third velocity V3 and delivered to the rotary conveying machine 6. The container bodies 5 may be gradually accelerated in a curved manner instead of a linear manner.

Here, the conveying chain device is a device having a pair of conveying chains, each forming an endless track, opposed to each other, and an annular protruded portion (a neck ring, etc.) formed on a mouth portion of the container body 5 is engaged between the conveying chains. Then the conveying chains are driven with the container body 5 suspended with its mouth, and thus the container body 5 is conveyed by the conveying chains. For example, the conveying chain as disclosed in JP4224274 (B2) may be used.

Further, instead of such a conveying chain device, a belt conveyor may be used. In other words, a plurality of container bodies 5 may be collectively conveyed to the belt conveyor by using the aforementioned conveying machine, and the container bodies 5 may be sequentially delivered from the belt conveyor to the carriers 6a of the rotary conveying machine 6. In other words, when such a conveying machine and a belt conveyor are used as the intermediate conveying device, a plurality of container bodies 5 can be collectively and gradually accelerated in a linear manner from the static state (preferably, a statically opened position) to the third velocity V3 and delivered to the carriers 6a of the rotary conveying machine 6. The container bodies 5 may also be gradually accelerated in a curved manner instead of a linear manner.

Further, in this case, a plurality of cups (in this example, six cups corresponding to the six container bodies 5) for conveyance called "HAKAMA" may be used, and a container body 5 may be disposed in each cup. In other words, when a plurality of container bodies 5 are collectively placed and disposed in a recess provided in each cup, the container bodies 5 can be conveyed by the intermediate conveying device, the rotary conveying machine 6 and the capper 7 while they are held in a stable state in which they are hard to be inclined. The aforementioned cup is effective especially when the container body 5 is formed into a thinner (lighter) body.

When such a cup is used, for example, a plurality of cups are disposed on the aforementioned belt conveyor, and the container bodies 5 can be collectively conveyed to the belt conveyor by using the aforementioned conveying machine, then disposed in the cups. When the container bodies 5 are disposed in cups, respectively, the belt conveyor may be in a resting state (a static state) or in a drive state.

Figure 4:
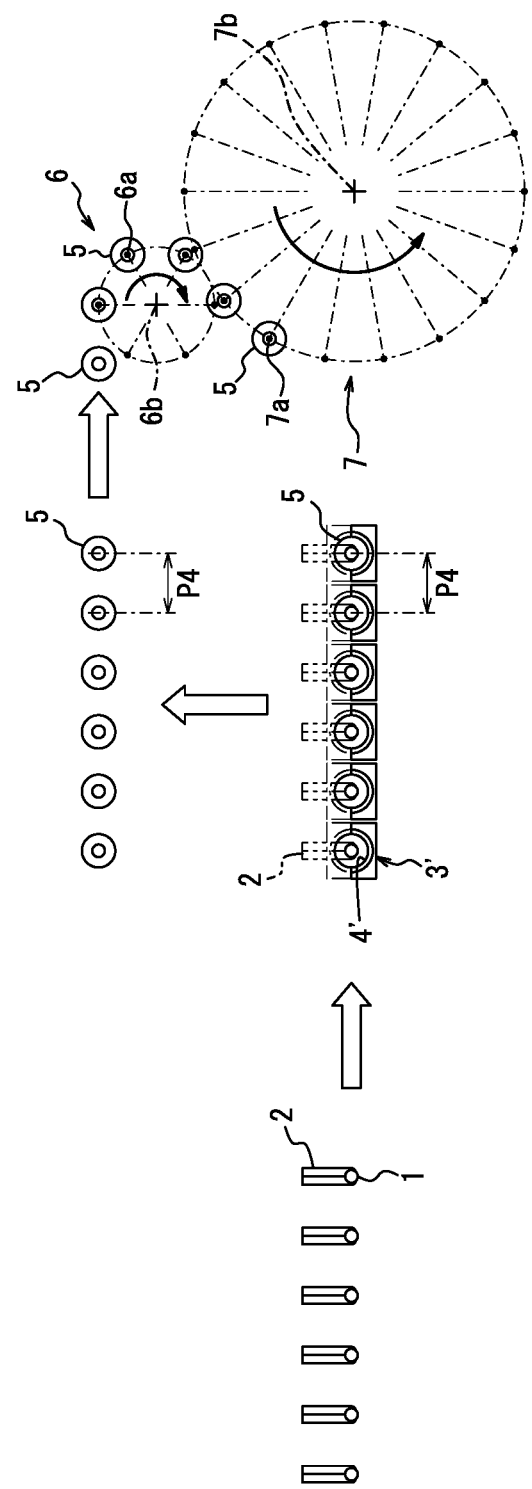
FIG. 4 is a schematic plan view of each step in a variation of the manufacturing method of a liquid containing container according to an embodiment of the present disclosure.

Moreover, as illustrated in FIG. 4, instead of being opened right and left, a mold 3' may be configured such that a plurality of cavities 4' are collectively or sequentially opened by rotating motion of a horizontally extending rotating axis, and after the mold is opened, the container bodies 5 may be collectively or sequentially ejected in a direction orthogonal to the longitudinal direction of the mold 3'. Further, after being ejected in the aforementioned manner, the container bodies 5 may be collectively and gradually accelerated from the statistic state to the third velocity V3 by the intermediate conveying device in a linear manner and be sequentially delivered to the carriers 6a of the rotary conveying machine 6. Instead of a linear manner, the container bodies 5 may be gradually accelerated in a curved manner.

In the rotary conveying step following the intermediate conveying step, the container bodies 5 are conveyed by the carriers 6a of the rotary conveying machine 6 and are sequentially delivered to the container holding portions 7a of the capper 7. As illustrated in FIG. 2, the carriers 6a are disposed at a constant second pitch P2 in the circumferential direction of the second central axis 6b and are configured to be displaced at a constant second velocity V2. Each carrier 6a can receive a container body 5 that is displaced close to the tangential direction of the circular rotational track of the carrier 6a, and convey it along the rotational track.

The rotary conveying machine 6 may be configured to have a rotary table fixed with the carriers 6a and rotating at a constant angular velocity in the circumferential direction of the second central axis 6b. Each carrier 6a receives the container body 5 from the intermediate conveying device and holds it. It may have an optional configuration if the container body 5 can be delivered to the container holding portion 7a of the capper 7.

For example, each carrier 6a may be configured as a holding device that grips or hooks a mouth or a barrel of the container body 5 to hold it. Further, when the container body 5 is conveyed by being disposed in the aforementioned cup, each carrier 6a may be configured as a holding device that holds a cap for conveyance by gripping or hooking it, or as an adhesion device that holds a cup for conveyance with a magnet or the like. Moreover, each carrier 6a may be configured as a suction device that holds a container body 5 or a cap for conveyance by sucking it with a suction device.

In a capping step following the rotary conveying step, a cap is attached to each mouth continuous with each barrel of container bodies 5 while the container bodies 5 are conveyed by the container holding portions 7a of the capper 7. The container holding portions 7a are provided at a constant first pitch P1 in the circumferential direction of the first central axis 7b, and are configured to be displaced at the constant first velocity V1. Each container holding portion 7a can receive a container body 5 that is displaced close to the tangential direction of the circular rotational track of the container holding portion 7a, and convey the container body 5 along the rotational track.

The capper 7 may be configured to have a rotary table fixed with a plurality of container holding portions 7a and rotating at a constant angular velocity in the circumferential direction of the first central axis 7b and a plurality of capping heads, for example. Each container holding portion 7a may be configured in the same manner as the case of the aforementioned carrier 6a. Further, each of the capping heads is disposed at the upper portion of the container holding portion 7a, and may be configured to attach a cap to each container body 5 held by the container holding portion 7a.

Here, as a cap, a topped cylindrical sealing cap may be used, for example. The sealing cap may be attached by screwing with a thread provided on the mouth, or by capping with an undercut portion provided on the mouth. Further, as a cap, besides the aforementioned sealing cap, a cap attached to a discharge device with a pump or a cylindrical portion for attaching a discharge plug may be used.

As described above, the manufacturing method of a liquid containing container according to this embodiment includes an intermediate conveying step of, after the mold 3 is opened, gradually accelerating a container body 5 to the third velocity V3 and delivering the container body 5 to the carrier 6a of the rotary conveying machine 6 by the intermediate conveying device. Thus, when a container body 5 is transferred from a batch-type step to a continuous step, a possibility of spilling of a liquid out of the container body 5 can be reduced, and as a result the conveying velocity of the container body 5 can be increased.

Moreover, in the manufacturing method of a liquid containing container according to this embodiment, the second velocity V2 and the second pitch P2 are constant in the circumferential direction of the second central axis 6b, the third pitch P3, the second pitch P2 and the first pitch P1 are matched to each other and the second velocity V2 is matched to the first velocity V1 and to the third velocity V3. Thus the container body 5 can be conveyed smoothly.

Figure 5:
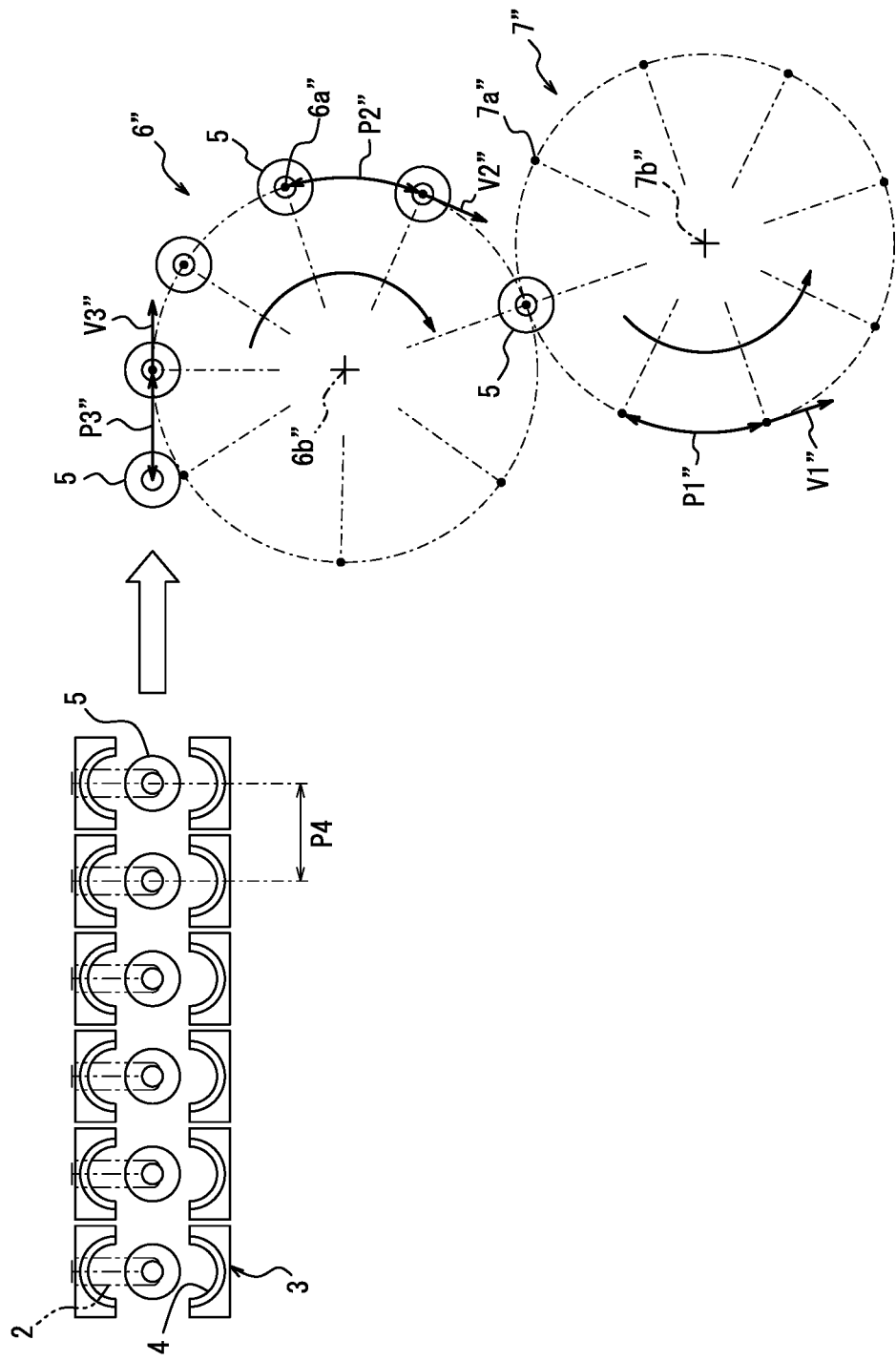
FIG. 5 is a schematic plan view of a part of each step of a manufacturing method of a liquid containing container according to another embodiment of the present disclosure.
Figure 6:
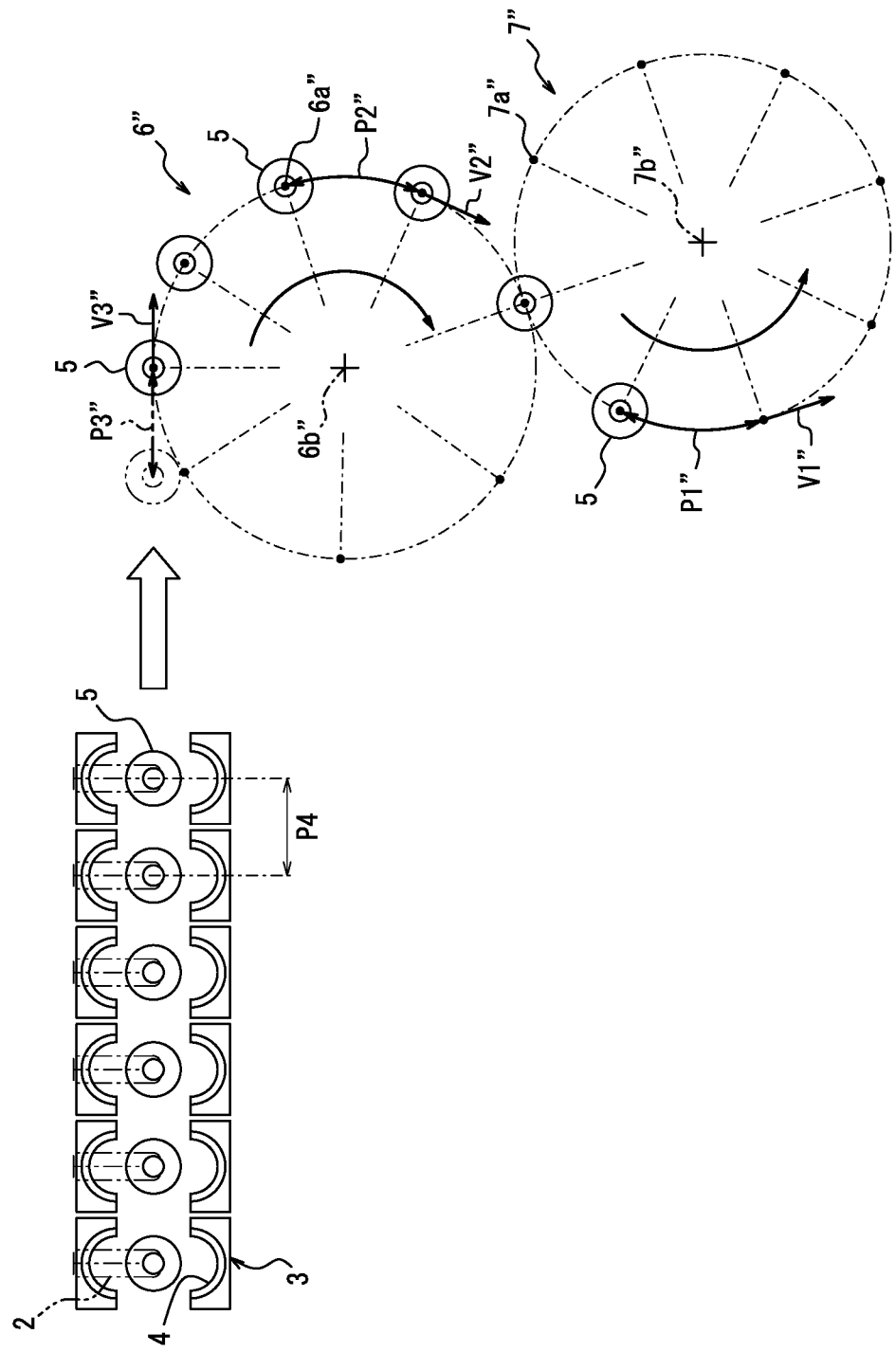
FIG. 6 is a plan view illustrating a state where a capper rotates by one pitch from the state illustrated in FIG. 5.
Figure 7:
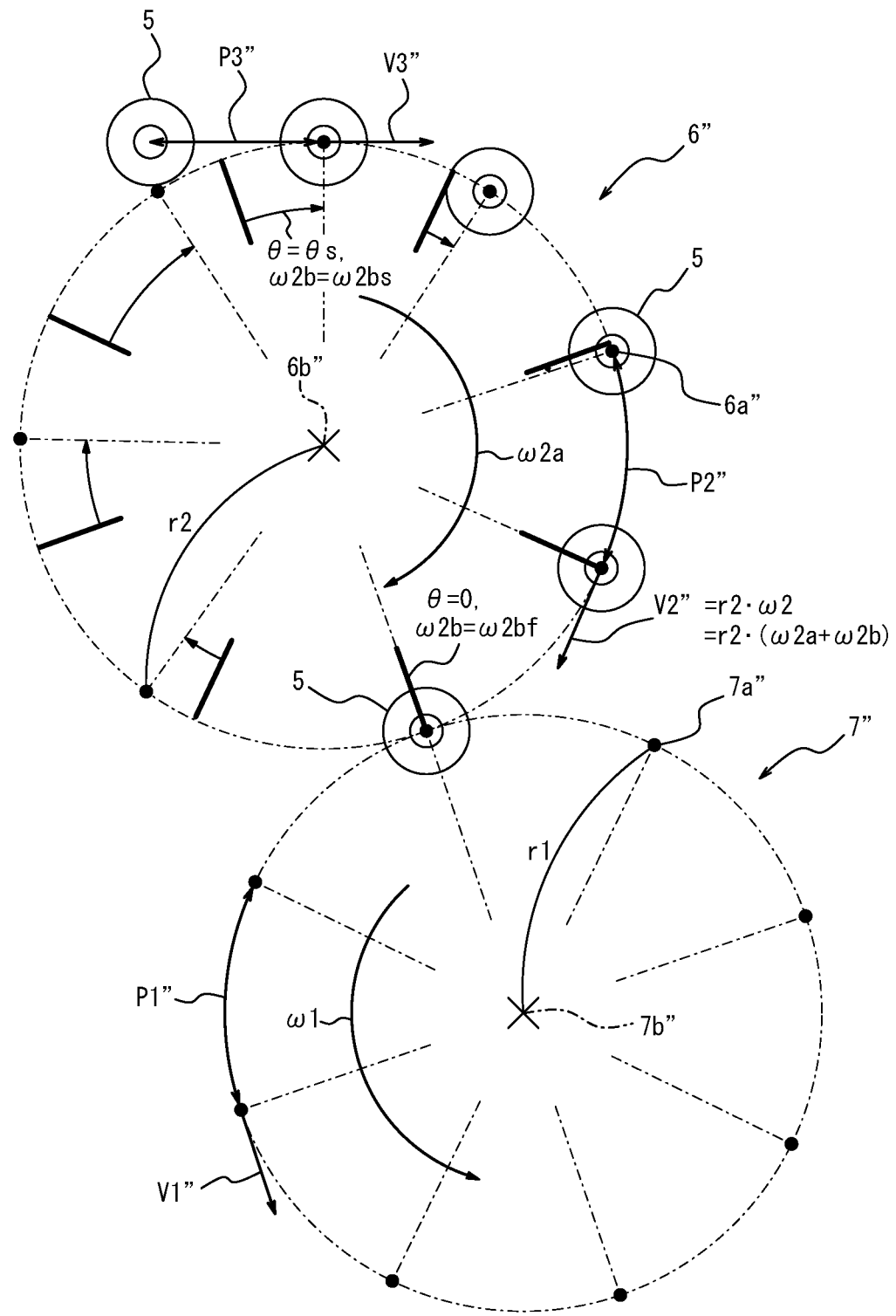
FIG. 7 is a partial enlarged view of FIG. 5.

Next, the manufacturing method of a liquid containing container according to another embodiment of the present disclosure will be illustrated in detail with reference to FIGS. 5 to 7. FIG. 5 is a schematic plan view of a part of each step of this embodiment and FIG. 6 is a plan view illustrating a state where the capper 7" rotates by one pitch from the state illustrated in FIG. 5. FIG. 7 is a partial enlarged view of FIG. 5. In this embodiment, except for the rotary conveying step, the preform disposing step, the liquid blow molding step, the intermediate conveying step and the capping step can be performed by using the same devices and procedures as those described in the embodiment illustrated with reference to FIGS. 1 to 4.

As illustrated in FIGS. 5 to 7, in this embodiment, the rotary conveying machine 6" includes a rotary table that holds a plurality of carriers 6a" and rotates at a constant angular velocity $\omega 2a$ (hereinafter referred to as a table angular velocity) in the circumferential direction of the second central axis 6b" and a carrier drive device that displaces forward/backward each of the carriers 6a", relative to the rotary table, at a variable angular velocity $\omega 2b$ (hereinafter referred to as a carrier relative angular velocity) in the circumferential direction of the second central axis 6b". Here, as the carrier drive device, a servo motor, for example, can be used.

The carriers 6a" each have a reference position disposed on the rotary table at a constant pitch in the circumferential direction of the second central axis, and each carrier 6a" is displaced forward/backward relative to the reference position. In other words, each carrier 6a" is configured such that an angle $\theta$ of displacing forward/backward relative to the reference position (hereinafter referred to as a carrier relative angle) and a carrier relative angular velocity $\omega 2b$ are directly servo-controlled. The carrier relative angular velocity $\omega 2b$ may be indirectly controlled by directly controlling the carrier relative angle $\theta$, or the carrier relative angle $\theta$ may be indirectly controlled by directly controlling the carrier relative angular velocity $\omega 2b$.

Here, preferably, the pitch P2"a of the reference position of each carrier 6a" is matched to the pitch P1" of the container holding portion 7a". In order to obtain P2"a=P1", the values of r2 and m are needed to be set so that r2/m=r1/n is completed. Here, r2 represents a distance from the second central axis 6b" to the center of each carrier 6a" (a rotation radius of the carrier 6a"), m represents the number of carriers 6a" provided for the rotary conveying machine 6", r1 represents a distance from the first central axis 7b" to the center of each container holding portion 7a" (a rotation radius of the container holding portion 7a"), and n represents the number of container holding portions 7a" provided for the capper 7".

At this time, preferably, the velocity (i.e. r2·$\omega 2a$) of a reference position of each carrier 6a" is matched to the velocity V1 of the container holding portion 7a". In this manner, in order to obtain r2·$\omega 2a$=V1", it is needed to set the value of $\omega 2a$ such that $\omega 2a=(r1/r2)\cdot\omega 1$ is completed. Here, $\omega 1$ is an angular velocity of the container holding portion 7a".

Further, according to the aforementioned configuration, an absolute angular velocity $\omega 2$ of each carrier 6a" (hereinafter referred to as a carrier absolute angular velocity) is a sum of the table angular velocity $\omega 2a$ and the carrier relative angular velocity $\omega 2b$. In other words, $\omega 2=\omega 2a+\omega 2b$ is obtained.

Here, a variable second velocity V2", which is a velocity at which each carrier 6a" is displaced in the circumferential direction of the second central axis 6b", is expressed in the following formula:

$$V''=r2\cdot\omega 2=r2\cdot(\omega 2a+\omega 2b)$$

The value V2"s of the second velocity V2" of each carrier 6a" at the time when the container body 5 is received from the intermediate conveying device is needed to be matched to the third velocity V3", and thus the following formula is completed:

$$V2''s=r2\cdot(\omega 2a+\omega 2bs)=V3''.$$

Thus, $\omega 2bs=V3''/r2\cdot\omega 2a$ is obtained.

Provided that $\omega 2bs$ is a value of the carrier relative angular velocity $\omega 2b$ at the time when the container body 5 is received from the intermediate conveying device.

Further, the value V2"f of the second velocity V2" of each carrier 6a" at the time when the container body 5 is delivered to each container holding portion 7a" of the capper 7" is needed to be matched to the first velocity V1", and thus the following formula is completed:

$$V2''f = r2 \cdot (\omega 2a + \omega 2bf) = V1''.$$

Thus, $\omega 2bf = V1''/r2 \cdot \omega 2a = r1 \cdot \omega 1/r2 \cdot \omega 2a$ is obtained.

Provided that $\omega 2bf$ is a value of the carrier relative angular velocity $\omega 2b$ at the time when the container body 5 is delivered to each container holding portion 7a" of the capper 7".

Further, in this embodiment, when the third velocity V3 of a plurality of container bodies 5 at the time when the container bodies 5 are delivered from the intermediate conveying device to the rotary conveying machine 6" is different from the first velocity V1" (not illustrated), the second velocity V2" is differentiated between the intermediate conveying device side and the capper 7" side so as to enable a plurality of carriers 6 of the rotary conveying machine 6" to receive a plurality of container bodies 5 from the intermediate conveying device and to deliver them to a plurality of container holding portions 7a" of the capper 7".

In other words, the carrier relative angular velocity $\omega 2b$ is controlled such that $\omega 2bf = V1''/r2 \cdot \omega 2a$ is completed while $\omega 2b = V3''/r2 \cdot \omega 2a$ is completed. Thus each carrier 6a" can receive and deliver the container body 5 even if the third velocity V3" and the first velocity V1" are different from each other. In this case, preferably, a change in the carrier relative angular velocity $\omega 2b$ from reception to deliver of the container body 5 by each carrier 6a" is controlled to be as small as possible such that the inertia force acting on the liquid in the container body 5 is suppressed.

Further, in this embodiment, as illustrated in FIGS. 5 to 7, when the third pitch P3" of a plurality of container bodies 5 at the time when they are delivered from the intermediate conveying device to the rotary conveying machine 6" is different from the first pitch P1", the second pitch is differentiated between the intermediate conveying device side and the capper 7" side so as to enable a plurality of carriers 6a" of the rotary conveying machine 6" to receive a plurality of container bodies 5 from the intermediate conveying device and to deliver them to a plurality of container holding portions 7a" of the capper 7".

In other words, the carrier relative angle θ is controlled so that it is differentiated between the intermediate conveying device side and the capper 7" side. Thus a container body 5 can be received and delivered by each carrier 6a" even if the third pitch P3" is different from the first pitch P1".

In this case, for example, a reference position of each carrier 6a" is adjusted so that a carrier relative angle θ of each carrier 6a" becomes zero at a position where the rotary conveying machine 6" delivers a container body 5 to the capper 7", and each carrier 6a" can be displaced to the position that is matched to the third pitch P3" by changing the carrier relative angle θ to a predetermined value Os by the time when a container body 5 is received, thus each carrier 6a" can receive a container body 5. Here, preferably, a change in the carrier relative angle θ from reception to deliver of a container body 5 by each carrier 6a" is controlled to be as small as possible so that an inertia force acting on the liquid in the container body 5 can be suppressed.

Instead of the aforementioned configuration, the third velocity V3" may always be matched to the first velocity V1" or the third pitch P3" may always be matched to the first pitch P1".

In this embodiment, as with the aforementioned embodiment illustrated with reference to FIGS. 1 to 4, an intermediate conveying step of, after the mold 3 is opened, gradually accelerating the container body 5 to the third velocity V3" and delivering it to the carrier 6a" of the rotary conveying machine 6" by the intermediate conveying device is included. Thus, when the container body 5 is transferred from the batch-type step to the continuous step, a possibility of spilling a liquid out of the container body 5 can be reduced. Therefore the conveying velocity of the container body 5 can be increased.

Moreover, as aforementioned, in this embodiment, when at least one of the third velocity V3" and the third pitch P3" of a plurality of container bodies 5 at the time when they are delivered from the intermediate conveying device to the rotary conveying machine 6" is different from the first velocity V1" and the first pitch P1" of a plurality of container holding portions 7a" of the capper 7", this difference of velocity and pitch is compensated by a change in the carrier relative angle θ and a carrier relative angular velocity $\omega 2b$ of the rotary conveying machine 6". Therefore, even if at least one of the third velocity V3" and the third pitch P3" is different from the first velocity V1" and the first pitch P1", the container body 5 can be conveyed smoothly from the intermediate conveying device to the capper 7".

The aforementioned matters are merely illustration of embodiments of the present disclosure, and needless to say, various alterations may be made within the scope of claims.

REFERENCE SIGNS LIST

1 Preform
2 Preform conveying device
3, 3' Mold
4, 4' Cavity
5 Container body
6, 6" Rotary conveying machine
6a, 6a" Carrier
6b, 6b" Second central axis
7, 7" Capper
7a, 7a" Container holding portion
7b, 7b" First central axis
P1, P1" First pitch
P2, P2" Second pitch
P3, P3" Third pitch
P4 Fourth pitch
V1, V1" First velocity
V2, V2" Second velocity
V2"s Second velocity value of each carrier at the time of reception of a container body
V2"f Second velocity value of each carrier at the time of delivery of a container body
V3, V3" Third velocity
ω2 Carrier absolute angular velocity
ω2a Table angular velocity
ω2b Carrier relative angular velocity
ω2bs Carrier relative angular velocity value at the time of reception of a container body
ω2bf Carrier relative angular velocity value at the time of delivery of a container body
ω1 Angular velocity of container holding portion
θ Carrier relative angle
θs Carrier relative angle value at the time of reception of a container body
r1 Rotation radius of container holding portion
r2 Rotation radius of carrier
n Number of container holding portions
m Number of carriers

The invention claimed is:

1. A manufacturing method of a liquid containing container for manufacturing a liquid containing container by using a mold for liquid blow molding, an intermediate conveying device, a rotary conveying machine and a rotary capper, the capper having a container holding portion configured to be displaced at a constant first velocity in a circumferential direction of a first central axis, and the rotary conveying machine having a carrier configured to be displaced at a second velocity in a circumferential direction of a second central axis; the method comprising:
   a liquid blow molding step of supplying a pressurized liquid into a preform disposed in a cavity of the mold to mold the preform into a container body having a barrel containing the liquid;
   an intermediate conveying step of, after the mold is opened, gradually accelerating the container body to a third velocity and delivering the container body to the carrier of the rotary conveying machine by the intermediate conveying device;
   a rotary conveying step of conveying the container body and delivering the container body to the container holding portion of the capper by the carrier of the rotary conveying machine; and
   a capping step of attaching a cap to a mouth continuous with the barrel of the container body while the container body is conveyed by the container holding portion of the capper.

2. The manufacturing method of a liquid containing container according to claim 1, wherein:
   the capper has a plurality of the container holding portions provided at a constant first pitch in the circumferential direction of the first central axis;
   the rotary conveying machine has a plurality of the carriers provided at a second pitch in the circumferential direction of the second central axis;
   the mold has a plurality of the cavities;
   in the liquid blow molding step, a plurality of the preforms are formed, by the mold, into a plurality of the container bodies each having the barrel containing the liquid;
   in the intermediate conveying step; after the mold is opened, the container bodies are gradually accelerated to the third velocity and sequentially delivered to the carriers of the rotary conveying machine by the intermediate conveying device;
   in the rotary conveying step, the container bodies are conveyed and sequentially delivered to the container holding portions of the capper by the carriers; and
   in the capping step, the cap is attached to the mouth of the container bodies while the container bodies are conveyed by the container holding portions.

3. The manufacturing method of a liquid containing container according to claim 2, wherein:
   the second velocity and the second pitch are to be constant in the circumferential direction of the second central axis;
   a third pitch of the container bodies at a time when the container bodies are delivered from the intermediate conveying device to the rotary conveying machine, second pitch and the first pitch are matched to each other; and
   the second velocity is matched to the first velocity and to the third velocity.

4. The manufacturing method of a liquid containing container according to claim 2, wherein the rotary conveying machine includes:
   a rotary table configured to hold the carriers and rotate at a constant angular velocity in the circumferential direction of the second central axis; and
   a carrier drive device configured to allow the carriers to be displaced forward/backward, respectively, relative to the rotary table in the circumferential direction of the second central axis.

5. The manufacturing method of a liquid containing container according to claim 4, wherein, when the third pitch of the container bodies at a time when the container bodies are delivered from the intermediate conveying device to the rotary conveying machine is different from the first pitch, the second pitch is differentiated between the intermediate conveying device side and the capper side so as to enable the carriers of the rotary conveying machine to receive the container bodies from the intermediate conveying device and to deliver the container bodies to the container holding portions of the capper.

6. The manufacturing method of a liquid containing container according to claim 4, wherein, when the third velocity is different from the first velocity, the second velocity is differentiated between the intermediate conveying device side and the capper side so as to enable the carriers of the rotary conveying machine to receive the container bodies from the intermediate conveying device and to deliver the container bodies to the container holding portions of the capper.

7. The manufacturing method of a liquid containing container according to claim 1, wherein the intermediate conveying device, the rotary conveying machine and the capper convey the container body with the container body disposed in a cup.

8. The manufacturing method of a liquid containing container according to claim 5, wherein, when the third velocity is different from the first velocity, the second velocity is differentiated between the intermediate conveying device side and the capper side so as to enable the carriers of the rotary conveying machine to receive the container bodies from the intermediate conveying device and to deliver the container bodies to the container holding portions of the capper.

9. The manufacturing method of a liquid containing container according to claim 2, wherein the intermediate conveying device, the rotary conveying machine and the capper convey the container body with the container body disposed in a cup.

10. The manufacturing method of a liquid containing container according to claim 3, wherein the intermediate conveying device, the rotary conveying machine and the capper convey the container body with the container body disposed in a cup.

11. The manufacturing method of a liquid containing container according to claim 4, wherein the intermediate conveying device, the rotary conveying machine and the capper convey the container body with the container body disposed in a cup.

12. The manufacturing method of a liquid containing container according to claim 5, wherein the intermediate conveying device, the rotary conveying machine and the capper convey the container body with the container body disposed in a cup.

13. The manufacturing method of a liquid containing container according to claim 6, wherein the intermediate conveying device, the rotary conveying machine and the capper convey the container body with the container body disposed in a cup.

14. The manufacturing method of a liquid containing container according to claim 8, wherein the intermediate conveying device, the rotary conveying machine and the capper convey the container body with the container body disposed in a cup.

* * * * *